United States Patent
Horn et al.

(10) Patent No.: US 11,240,071 B1
(45) Date of Patent: Feb. 1, 2022

(54) CHANNEL EQUALIZATION FOR WIRELESS COMMUNICATION DEVICES

(71) Applicant: QUALCOMM Incorporated, San Diego, CA (US)

(72) Inventors: Idan Michael Horn, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/026,003

(22) Filed: Sep. 18, 2020

(51) Int. Cl.
| | |
|---|---|
| *G06F 3/16* | (2006.01) |
| *H04L 25/03* | (2006.01) |
| *H04L 5/00* | (2006.01) |
| *H04L 25/02* | (2006.01) |

(52) U.S. Cl.
CPC ...... *H04L 25/03006* (2013.01); *H04L 5/0005* (2013.01); *H04L 5/0048* (2013.01); *H04L 25/0202* (2013.01); *G06F 3/165* (2013.01); *H04L 2025/03433* (2013.01)

(58) Field of Classification Search
CPC ... H04L 5/0048; H04L 5/0055; H04L 5/0051; H04L 1/0003; H04L 5/0007; H04L 5/0023; H04L 5/0053; H04L 27/2602; H04L 5/001; H04L 25/0224; H04L 27/26; H04L 5/0044; H04W 72/042; H04W 72/0446; H04W 72/1289; H04W 88/02; H04W 24/10; H04W 72/0413; H04W 72/0453; H04W 72/14; H04W 76/27; H04W 4/06; H04W 52/0229; H04B 7/0617; H04B 7/0626; H04B 7/0695; H04B 7/0413; H04B 7/0417; H04B 7/0639; H04B 10/2581; H04B 10/50; H04B 7/0452; H04B 7/063; H04B 7/15542; H04B 10/2525; G06F 3/165; G06F 1/1698; G06F 3/017
USPC .................................................. 375/259, 232
See application file for complete search history.

(56) References Cited

U.S. PATENT DOCUMENTS

| | | | |
|---|---|---|---|
| 8,416,759 B1 * | 4/2013 | Narasimhan ...... | H04W 56/0035 370/344 |
| 2010/0128774 A1 * | 5/2010 | He .................... | H04L 25/03159 375/232 |
| 2012/0106660 A1 * | 5/2012 | Hasegawa .............. | H04L 27/38 375/259 |
| 2012/0188994 A1 * | 7/2012 | Palanki ................. | H04B 1/69 370/344 |
| 2013/0170590 A1 * | 7/2013 | Hyll .................... | H04L 27/2686 375/343 |
| 2013/0185617 A1 * | 7/2013 | Roh ..................... | H04L 1/0003 714/800 |

(Continued)

*Primary Examiner* — Eva Y Puente
(74) *Attorney, Agent, or Firm* — Patterson & Sheridan, LLP

(57) ABSTRACT

A wireless communication device is described. The wireless communication device includes a receiver. The receiver is configured to determine a time-domain sample of a single carrier based on a received signal. The receiver is also configured to determine an estimated value based on the time-domain sample. The receiver is further configured to perform slicing based on the estimated value to produce a sliced value. The receiver is additionally configured to adapt a frequency-domain coefficient based on the estimated value and the sliced value. The receiver is also configured to perform channel equalization based on the frequency-domain coefficient.

26 Claims, 10 Drawing Sheets

(56) References Cited

U.S. PATENT DOCUMENTS

2015/0156036 A1* 6/2015 Genossar ............ H04L 25/0202
375/232
2016/0359646 A1* 12/2016 Iqbal ................. H04L 25/03159
2017/0070377 A1* 3/2017 Sawahashi ........ H04L 25/03305

* cited by examiner

CHANNEL EQUALIZATION FOR WIRELESS COMMUNICATION DEVICES

FIELD OF DISCLOSURE

The present disclosure relates generally to electronic devices. More specifically, the present disclosure relates to channel equalization for wireless communication devices.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently, or with higher quality are often sought after.

Some electronic devices (e.g., cellular phones, smartphones, laptop computers, etc.) communicate with other electronic devices. For example, electronic devices may transmit and/or receive radio frequency (RF) signals to communicate. Improving electronic device communication may be beneficial.

SUMMARY

A wireless communication device is described. The wireless communication device includes a receiver. The receiver is configured to determine a time-domain sample of a single carrier based on a received signal. The receiver is also configured to determine an estimated value based on the time-domain sample. The receiver is further configured to perform slicing based on the estimated value to produce a sliced value. The receiver is additionally configured to adapt a frequency-domain coefficient based on the estimated value and the sliced value. The receiver is also configured to perform channel equalization based on the frequency-domain coefficient.

To determine the time-domain sample, the receiver may be configured to transform the received signal to produce a frequency-domain sample. The receiver may also be configured to perform an initial channel equalization on the frequency-domain sample to produce an equalized sample. The receiver may further be configured to inverse transform the equalized sample to produce the time-domain sample of the single carrier.

The receiver may be configured to estimate a channel based on a received reference signal. The receiver may also be configured to initialize the frequency-domain coefficient based on the estimated channel. The receiver may further be configured to perform the initial channel equalization based on the initialized frequency-domain coefficient.

The receiver may be configured to perform the slicing in response to a determination of a channel condition. The channel condition may be based on at least one of Doppler spread, delay spread, or wireless communication device movement.

The receiver may be configured to initialize a time-domain coefficient to zero. The receiver may be configured to adapt a time-domain coefficient based on the estimated value and the sliced value.

The receiver may be configured to determine a feedback value based on a time-domain coefficient. The receiver may also be configured to determine the estimated value based on the feedback value and the time-domain sample.

The receiver may be configured to determine the estimated value as a difference between the feedback value and the time-domain sample. The time-domain sample may be based on a single-carrier frequency-division multiple access (SC-FDMA) signal.

A method performed by a wireless communication device is also described. The method includes determining a time-domain sample of a single carrier based on a received signal. The method also includes determining an estimated value based on the time-domain sample. The method further includes performing slicing based on the estimated value to produce a sliced value. The method additionally includes adapting a frequency-domain coefficient based on the estimated value and the sliced value. The method also includes performing channel equalization based on the frequency-domain coefficient.

A non-transitory tangible computer-readable medium storing computer-executable code is also described. The computer-readable medium includes code for causing a processor to determine a time-domain sample of a single carrier based on a received signal. The computer-readable medium also includes code for causing the processor to determine an estimated value based on the time-domain sample. The computer-readable medium further includes code for causing the processor to perform slicing based on the estimated value to produce a sliced value. The computer-readable medium additionally includes code for causing the processor to adapt a frequency-domain coefficient based on the estimated value and the sliced value. The computer-readable medium also includes code for causing the processor to perform channel equalization based on the frequency-domain coefficient.

An apparatus is also described. The apparatus includes means for determining a time-domain sample of a single carrier based on a received signal. The apparatus also includes means for determining an estimated value based on the time-domain sample. The apparatus further includes means for performing slicing based on the estimated value to produce a sliced value. The apparatus additionally includes means for adapting a frequency-domain coefficient based on the estimated value and the sliced value. The apparatus also includes means for performing channel equalization based on the frequency-domain coefficient.

DETAILED DESCRIPTION

Figure 1:
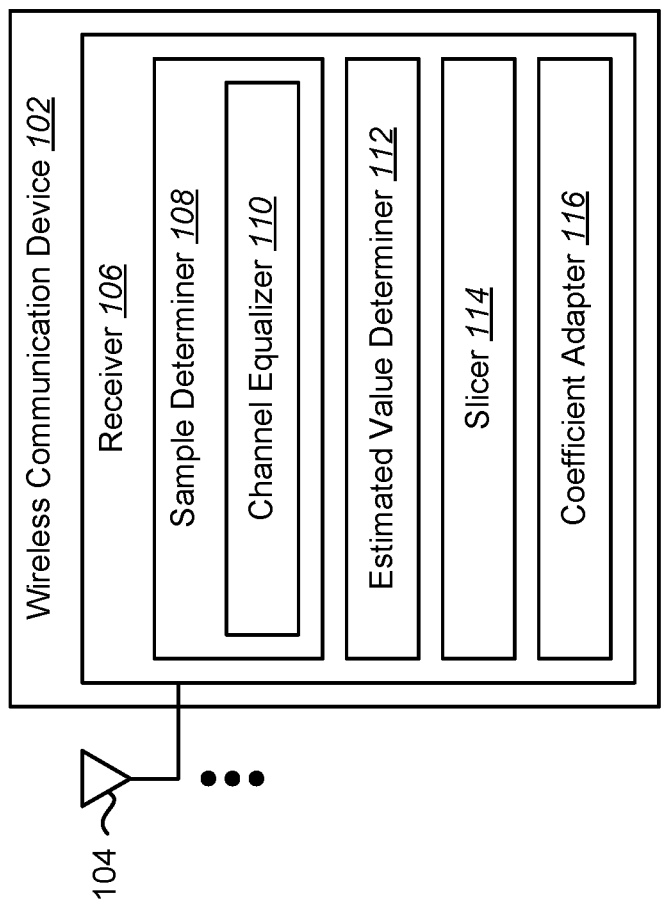
FIG. 1 is a block diagram illustrating one example of a wireless communication device in which systems and methods for channel equalization for wireless communication devices may be implemented.

Some configurations of the systems and methods disclosed herein relate to channel equalization for wireless communication devices. Mobile devices may be wireless communication devices that may communicate with other devices using radio frequency (RF) signals in mobile scenarios. In high mobility scenarios, an error floor occurs due to high Doppler spread, which may cause significant channel estimation error (e.g., inter-symbol interference (ISI)). Some examples of high mobility scenarios include some cellular vehicle-to-everything (C-V2X) scenarios. For instance, significant channel estimation errors occur when attempting to communicate with a vehicle that is moving at a relatively high speed. Some approaches to improving communication in high mobility scenarios may include adding reference symbols (e.g., demodulation reference signal (DMRS) symbols). In some cases, adding more reference symbols may be insufficient to provide reliable communication. For instance, a 100% error rate may occur for a C-V2X Release 15 pilot pattern (with reference symbols 2, 5, 8, and 11, for example) and high modulation and coding schemes (MCSs) in 16 quadrature amplitude modulation (16-QAM) with a Doppler shift of 2700 hertz (Hz). Additionally, a 100% error rate may occur for some scenarios in release 16 C-V2X that use an orthogonal frequency-division multiplexing (OFDM) waveform.

Some configurations of the techniques described herein improve detection in high mobility scenarios. For example, some of the techniques described herein use additive decision feedback equalization in coherent single-carrier frequency-division multiple access (SC-FDMA) for high-mobility scenarios. Some configurations of the techniques described herein may improve coverage and/or throughput. Some configurations of the techniques described herein may improve a block error rate (BLER) from 100% to 0% for some high mobility and/or high MCS scenarios.

Some configurations of the techniques described herein utilize additive decision feedback equalization (DFE). For example, DFE feed forward is initialized with a frequency domain channel estimation. In some approaches, feedback is initialized with zeros in a length of delay spread or cyclic prefix (CP). For instance, feedback may not be applied when equalization is relatively accurate. In some examples, DFE is added in a receiver to compensate for channel estimation error only for high-mobility scenarios.

Some configurations of the techniques described herein perform feed forward. After the feed forward, for example, an inverse transform (e.g., inverse discrete Fourier transform (IDFT)) may produce time-domain samples. The time-domain samples may be subtracted with feedback samples and passed through a slicer (e.g., hard slicer) with an established constellation. For instance, hard slicing is performed on estimated values from the subtraction. In some configurations, an adaptive procedure (e.g., normalized least mean squares (NLMS) procedure) is utilized to adapt (e.g., determine, update, etc.) coefficients (e.g., weights). For example, the coefficients are adapted with a configurable step size. Some configurations of the techniques described herein may determine a channel condition to determine whether to activate adaptive decision feedback equalization. For instance, some configurations of the techniques utilize a Doppler detector to estimate Doppler spread. If the Doppler spread satisfies a threshold, for instance, adaptive decision feedback equalization is activated. As described above, relatively high Doppler shift may cause significant channel estimation errors. Some of the techniques described herein may be useful for scenarios with high Doppler shift.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of a wireless communication device 102 in which systems and methods for channel equalization for wireless communication devices may be implemented. The wireless communication device 102 (e.g., mobile device) is a device or apparatus for transmitting and/or receiving RF signals. Examples of the wireless communication device 102 include user equipments (UEs), smartphones, tablet devices, computing devices, computers (e.g., desktop computers, laptop computers, etc.), televisions, cameras, virtual reality devices (e.g., headsets), vehicles (e.g., semi-autonomous vehicles, autonomous vehicles, etc.), robots, aircraft, drones, unmanned aerial vehicles (UAVs), healthcare equipment, gaming consoles, Internet of Things (IoT) devices, etc. The wireless communication device 102 includes one or more components or elements. One or more of the components or elements may be implemented in hardware (e.g., circuitry) or a combination of hardware and instructions (e.g., a processor with software and/or firmware stored in memory).

In some configurations, the wireless communication device 102 includes a receiver 106 and/or one or more antennas 104. In some configurations, the wireless communication device 102 includes one or more other components and/or elements. For example, the wireless communication device 102 may include a transmitter, memory, processor, and/or display (e.g., touchscreen), etc.

The receiver 106 enables the wireless communication device 102 to receive signals from one or more other electronic devices. For example, the receiver 106 provides an interface for wireless communications. In some configurations, the receiver 106 may be coupled to one or more antennas 104 for receiving signals. The receiver 106 may be circuitry configured to perform one or more functions. For example, the receiver 106 may include one or more integrated circuits with circuit components (e.g., transistors, resistors, capacitors, etc.). For instance, the receiver 106 includes one or more switches, filters, amplifiers, converters, and/or processors, etc. In some configurations, the receiver 106 may be included in an RF front-end and/or may include an RF front-end.

The antenna(s) 104 may capture one or more signals (e.g., electromagnetic signals, RF signals, wireless signals, reference signals, data signals, etc.) and provide the signal(s) to the receiver 106. The receiver 106 may convert the signal(s) or portions of the signal(s) into data (e.g., bits). For example, the receiver 106 performs filtering, analog-to-digital conversion, transformation (e.g., transformation to the frequency domain and/or transformation to the time domain), demapping (e.g., subcarrier demapping), equalization, demodulation, detection, and/or decoding, etc. In some configurations, the receiver 106 executes instructions to perform the one or more functions. In some configurations, the receiver 106 includes one or more functionalities that are structurally implemented as hardware (e.g., circuitry). In some configurations, the receiver 106 includes a baseband processor, a modem, a modem processor, and/or any combination thereof. In some examples, the wireless communication device 102 and/or the receiver 106 may be configured to perform one or more of the methods 200, 300, 500, functions, and/or operations described in relation to one or more of the Figures. In some examples, the wireless communication device 102 and/or receiver 106 includes one or more of the components and/or elements described in relation to one or more of the Figures.

In some configurations, the receiver 106 may be an example of a SC-FDMA receiver and/or of an orthogonal frequency-division multiplexing (OFDM) receiver. For example, some of the techniques described herein may be implemented in a receiver. In some examples, the wireless communication device 102 and/or receiver 106 may implement one or more aspects of specifications (e.g., 3rd Generation Partnership Project (3GPP) Release 15, 3GPP Release 16, fifth generation (5G), New Radio (NR), and/or Long-Term Evolution (LTE), etc.). For instance, one or more of the techniques described herein may be utilized for future specification releases. In some configurations, the receiver 106 receives signals from a network or networks. For instance, the receiver 106 may receive signals from a cellular network, wireless local area network (WLAN), and/or personal area network (PAN), etc.

In some configurations, the receiver 106 receives signals (e.g., Physical downlink packets, downlink control information, reference signals, Physical Sidelink Shared Channel (PSSCH) information, Physical Sidelink Control Channel (PSCCH) information, and/or Demodulation Reference Signals (DMRS), etc.) from one or more devices (e.g., base station, evolved NodeB (eNodeB), next generation NodeB (gNB), etc.). In some examples, one or more network devices (e.g., base stations, access points, wireless communication devices, etc.) may send signals representing digital information to the wireless communication device 102. In some examples, the received signal may be an SC-FDMA signal.

In some configurations, the receiver 106 includes a sample determiner 108, a channel equalizer 110, an estimated value determiner 112, a slicer 114, and/or a coefficient adapter 116. One or more of the components and/or elements (e.g., sample determiner 108, channel equalizer 110, estimated value determiner 112, slicer 114, and/or coefficient adapter 116) may be implemented in hardware (e.g., circuitry) or in a combination of hardware and instructions (e.g., processor with software and/or firmware).

The sample determiner 108 may determine one or more time-domain samples based on a received signal. For example, the sample determiner 108 determines a time-domain sample of a single carrier based on a received signal. In some configurations, to determine the time domain sample(s), the receiver 106 (e.g., sample determiner 108) transforms the received signal to produce a frequency-domain sample. For example, the sample determiner 108 performs a Fourier transform (e.g., fast Fourier transform (FFT), discrete Fourier transform, etc.) to produce one or more frequency-domain samples. In some configurations, performing an FFT on one or more received samples to produce one or more frequency-domain samples may be performed in accordance with Equation (1).

$$Y_i = \frac{1}{N} \sum_{n=0}^{N-1} y_n e^{-j2\pi\left(\frac{ni}{N}\right)} \tag{1}$$

In Equation (1), $y_n$ is a received sample with index n (e.g., received samples in the time domain, $(y_0, y_1, \ldots, y_{N-1})$, etc.), N is the FFT (e.g., discrete Fourier transform (DFT)) size, $Y_i$ is a frequency-domain sample with index i, j is $\sqrt{-1}$, and e is Euler's number. For instance, $Y_i$ may be a DFT output in the frequency domain.

In some examples, to determine the time-domain sample(s), the receiver 106 (e.g., sample determiner 108, channel equalizer 110) performs a channel equalization on one or more frequency-domain samples to produce one or more equalized samples. For instance, the sample determiner 108 may multiply the frequency-domain samples by corresponding frequency-domain coefficients (e.g., feedforward coefficients, $(G_{ff,0}, G_{ff,1}, \ldots, G_{ff,N-1})$, etc.) to produce the equalized samples.

In some examples, to determine the time-domain sample(s), the receiver 106 (e.g., sample determiner 108) inverse transforms the equalized sample to produce a time-domain sample (of the single carrier, for example). For instance, the wireless communication device 102 (e.g., sample determiner 108, channel equalizer 110) may perform the channel equalization and inverse transform the equalized sample(s) to produce the time-domain sample(s) in accordance with Equation (2).

$$z_n = \frac{1}{M} \sum_{m=0}^{M-1} Y_m G_{ff,m} e^{j2\pi\left(\frac{nm}{M}\right)} \tag{2}$$

In Equation (2), $Y_m$ is a frequency-domain sample with index m (e.g., $Y_i$ from Equation (1), $(Y_0, Y_1, \ldots, Y_{M-1})$, etc.), M is the inverse transform (e.g., inverse fast Fourier transform (IFFT), inverse discrete Fourier transform (IDFT)) size, and $z_n$ is a time-domain sample with index n (e.g., $(z_0, z_1, \ldots, z_{M-1})$). In some examples, the time-domain sample may be based on an SC-FDMA signal.

In some configurations, the receiver 106 (e.g., sample determiner 108, channel equalizer 110) may perform an initial channel equalization on the frequency-domain sample to produce an equalized sample. For example, the receiver 106 (e.g., sample determiner 108, channel equalizer 110) estimates a channel based on a received reference signal. For instance, the receiver 106 may receive a DMRS symbol that may be utilized to estimate the channel. The estimated channel may indicate one or more initial frequency-domain coefficients. In some examples, the receiver 106 (e.g., sample determiner 108, channel equalizer 110) performs linear equalization (e.g., minimum mean square error (MMSE) linear equalization) to produce the initial frequency-domain coefficient(s).

In some examples, the receiver 106 (e.g., sample determiner 108, channel equalizer 110) initializes one or more frequency-domain coefficients based on the estimated channel. For example, the frequency-domain coefficients for channel equalization are set to the initial frequency-domain coefficients. The initialized frequency-domain coefficients may be utilized to perform the initial channel equalization. For instance, the receiver 106 (e.g., sample determiner 108, channel equalizer 110) performs the initial channel equalization based on the initialized frequency-domain coefficient(s). For example, the initial channel equalization and inverse transform may be performed to determine (initial) time-domain samples.

In some configurations, the receiver 106 (e.g., estimated value determiner 112) determines an estimated value based on a time-domain sample. For example, the estimated value determiner 112 may determine a difference between the time-domain sample and one or more feedback values to determine an estimated value. A feedback value may be based on one or more previous sliced values and/or one or more time-domain coefficients. For example, a feedback value may be calculated as a sum of products of previous sliced values and time-domain coefficients. In some examples, the receiver 106 (e.g., estimated value determiner 112) determines an estimated value in accordance with Equation (3).

$$\tilde{x}_n = z_n - \sum_{k=1}^{K} g_{fb,k}\hat{x}_{n-k} \tag{3}$$

In Equation (3), $\hat{x}_n$ is a sliced value with index n, K is a parameter (e.g., Doppler spread, cyclic prefix, or another value), $g_{fb,k}$ is a time-domain coefficient, $\sum_{k=1}^{K} g_{fb,k}\hat{x}_{n-k}$ is a feedback value, and $\tilde{x}_n$ is an estimated value with index n. In some examples, one or more estimated values may be utilized for further reception operations. For instance, one or more estimated values may be provided to a demodulator and/or decoder for decoding. In some examples, the estimated value(s) may be decoded to produce data (e.g., received bits).

In some configurations, the receiver 106 (e.g., estimated value determiner 112) determines a feedback value (e.g., $\sum_{k=1}^{K} g_{fb,k}\hat{x}_{n-k}$) based on one or more time-domain coefficients (e.g., $g_{fb}$). For example, the receiver 106 (e.g., estimated value determiner 112) may sum products of sliced values and time-domain coefficients to determine the feedback value. In some examples, the receiver 106 initializes a time-domain coefficient to zero. For instance, one or more time-domain coefficients (e.g., $g_{fb}$) may be set to zero for an initial pass or iteration. Accordingly, the estimated value may be equal to the time-domain sample for an initial pass or iteration (e.g., $\tilde{x}_n = z_n$) in some approaches.

In some configurations, the receiver 106 (e.g., estimated value determiner 112) determines an estimated value based on a feedback value and a time-domain sample. As illustrated in Equation (3), the estimated value $\tilde{x}_n$ may be a difference between the feedback value and the time-domain sample. For instance, the receiver 106 (e.g., estimated value determiner 112) may determine the estimated value as a difference (e.g., subtraction) between the feedback value and the time-domain sample.

In some examples, the estimated value is a soft estimate. For instance, the estimated value may be a soft decision for a received value. In some examples, the sliced value is a hard value (e.g., hard-sliced value and/or hard decision for a received value). In some approaches, the hard value is utilized for updating coefficients. In some examples, the hard value may not be utilized in decoding.

In some configurations, the estimated value may be expressed as given in Equations (4)-(6).

$$\tilde{x}_n = z_n - \sum_{k=1}^{K} g_{fb,k}\hat{x}_{n-k} = \bar{g}_d^H \bar{u}_{d,n} \tag{4}$$

where $$\bar{g}_d \triangleq [G_{ff,0}, G_{ff,1}, \ldots, G_{ff,M}, g_{fb,1}, \ldots, g_{fb,K}]^T \tag{5}$$

and $$\bar{u}_{d,n} \triangleq \tag{6}$$
$$\left[\frac{1}{M}Y_0, \frac{1}{M}Y_1 e^{j2\pi(\frac{n}{M})}, \ldots, \frac{1}{M}Y_{M-1} e^{j2\pi(\frac{n(M-1)}{M})}, -\hat{x}_{n-1}, \ldots, -\hat{x}_{n-N_K}\right]^T$$

In Equations (4)-(6), $\bar{g}_d$ is a coefficient vector, $\bar{u}_{d,n}$ is a value or sample vector, H denotes a Hermitian, and T denotes transpose. The coefficient vector may include frequency-domain coefficients and time-domain coefficients. As illustrated in Equations (4)-(6), an estimated value may be determined based on a product of the coefficient vector and the value vector in some approaches.

In some configurations, the receiver 106 (e.g., slicer 114) performs slicing based on the estimated value to produce a sliced value. The estimated value may be an input to the slicer 114. The slicer 114 may utilize an established constellation to perform slicing. For instance, the wireless communication device 102 may determine the constellation when establishing a link with another device (e.g., base station). In some approaches, the slicer 114 determines a nearest constellation point to the estimated value as the sliced value (e.g., hard-sliced value, hard value, hard decision, etc.). For instance, the slicer 114 determines a Euclidean distance between the estimated value and one or more constellation points. The constellation point with the smallest distance may be selected as the sliced value. As described above, the sliced value(s) (e.g., $\hat{x}_{n-1}$, etc.) may be utilized to determine a feedback value for determining a subsequent estimated value.

In some configurations, the receiver 106 (e.g., coefficient adapter 116) adapts a frequency-domain coefficient and/or a time-domain coefficient based on the estimated value and the sliced value. For example, the coefficient adapter 116 adapts one or more frequency-domain coefficients and/or one or more time-domain coefficients based on the estimated value and the sliced value. For instance, the coefficient adapter 116 may determine a difference (e.g., subtraction) based on the sliced value and the estimated value (e.g., a difference of the estimated value and the sliced value, a difference of conjugates, and/or $\hat{x}^*_n - \tilde{x}^*_n$, etc.). The difference may be utilized in an adaptive procedure to adapt (e.g., update) the frequency-domain coefficient(s) (e.g., feed-forward coefficient(s), $G_{ff}$) and/or the time-domain coefficient(s) (e.g., feedback coefficient(s), $g_{fb}$). For example, a least mean squares (LMS) approach may be utilized to update feed-forward and/or feedback coefficients.

In some configurations, the receiver 106 (e.g., coefficient adapter 116) adapts the frequency-domain coefficient(s) and/or the time-domain coefficient(s) based on a cost function. An example of a cost function is expressed as given in Equation (7).

$$\|\bar{g}_{d,n+1} - \bar{g}_{d,n}\|_2^2 \quad (7)$$

The coefficient adapter 116 may minimize the cost function to adapt the frequency-domain coefficient(s) and/or the time-domain coefficient(s). For example, the cost function may be minimized to get a minimum step or smallest change possible between iterations (e.g., coefficient vectors for n and n+1). The coefficient adapter 116 may find weights that minimize the cost function. For example, the weights may be $\bar{g}_{d,n+1}$, which may be optimized and/or minimized in an iterative approach. For instance, Equation (9), below, may be utilized to optimize and/or minimize the weights iteratively based on previous weight estimation(s), input $\bar{u}^*_{d,n}$, and/or $\hat{x}_n$. In some configurations, the cost function may be minimized subject to a constraint. An example of a constraint is given in Equation (8).

$$\bar{g}_{d,n+1}{}^H \bar{u}_{d,n} = \hat{x}_n \quad (8)$$

In Equation (8), the constraint sets a product of the coefficient vector for a next iteration and the value vector equal to the sliced value.

In some configurations, the frequency-domain coefficient(s) and/or the time-domain coefficient(s) may be adapted (e.g., updated) in accordance with Equation (9).

$$\bar{g}_{d,n+1} = \bar{g}_{d,n} + \mu \frac{\bar{u}_{d,n}}{\|\bar{u}_{d,n}\|_2^2}(\hat{x}_n^* - \bar{g}_{d,n}^T \bar{u}_{d,n}^*) \quad (9)$$

In Equation (9), $\mu$ is a configurable parameter and * denotes a conjugate. For example, $\mu$ may be a step size with a value between 0 and 1 (e.g., 0.1). In some examples, a term of Equation (9) (e.g., $(\hat{x}^*_n - \bar{g}_{d,n}^T \bar{u}^*_{d,n})$) may correspond to a difference based on the sliced value (e.g., conjugate of the sliced value, $\hat{x}^*_n$) and the estimated value (e.g., conjugate of the estimated value, $\tilde{x}^*_n$, or $\bar{g}_{d,n}^T \bar{u}^*_{d,n}$). In some configurations, Equation (9) may be solved to determine adapted (e.g., updated) frequency-domain coefficients and/or time-domain coefficients for a next iteration (e.g., the coefficient vector $\bar{g}_{d,n+1}$). For instance, Equation (9) may be an example of an update equation that includes the coefficient vector $\bar{g}_{d,n}$, a configurable parameter, and a gradient (e.g., $$\frac{\bar{u}_{d,n}}{\|\bar{u}_{d,n}\|_2^2}(\hat{x}_n^* - \bar{g}_{d,n}^T \bar{u}_{d,n}^*)$$

) In this example, the gradient includes a normalized value vector $$\left(\frac{\bar{u}_{d,n}}{\|\bar{u}_{d,n}\|_2^2}\right)$$

multiplied by the conjugate of the constraint $(\hat{x}^*_n - \bar{g}_{d,n}^T \bar{u}^*_{d,n})$. For instance, the value vector may be normalized in order to normalize the least mean square error (LMSE).

An example of a development of Equation (9) is given in Equation (10).

$$L(g_{n+1}, g_n, \lambda) = \|g_{n+1} - g_n\|_2^2 + \lambda(\hat{x}_n - g_{n+1}^H u_n) =$$
$$\sum \|g_{n+1}(k) - g_n(k)\|_2^2 + \lambda\left(\hat{x}_n - \sum g_{n+1}^H(k) u_n(k)\right)$$

$$\nabla L(g_{n+1}, \lambda) = \begin{bmatrix} 2g_{n+1}^H(1) - 2g_n^H(1) - \lambda u_n^H(1) \\ * \\ 2g_{n+1}^H(k) - 2g_n^H(k) - \lambda u_n^H(k) \\ * \\ \hat{x}_n - \sum g_{n+1}^H(k) u_n(k) \end{bmatrix} = \begin{bmatrix} 0 \\ 0 \\ 0 \\ 0 \\ 0 \end{bmatrix}$$

$$\begin{bmatrix} g_{n+1}^H(1) = \frac{2g_n^H(1) + \lambda u_n^H(1)}{2} \\ g_{n+1}^H(k) = \frac{2g_n^H(k) + \lambda u_n^H(k)}{2} \\ \hat{x}_n = \sum \frac{2g_n^H(k) + \lambda u_n^H(k)}{2} \bar{u}_n(k) \end{bmatrix}$$

$$2\hat{x}_n = 2g_n^H u_n + \lambda u_n^H u_n$$

$$\lambda = \frac{2}{\|u_n\|_2^2}(\hat{x}_n - g_n^H u_n)$$

$$g_{n+1}^H(k) = g_n^H(k) + \frac{u_n^H(k)}{\|u_n\|_2^2}(\hat{x}_n - g_n^H u_n)$$

A conjugate may be added to yield Equation (9).

$$g_{n+1} = g_n + \mu \frac{u_n}{\|u_n\|_2^2}(\hat{x}_n^* - g_n^T u_n^*) \quad (10)$$

In Equation (10), L is the Lagrangian and $\nabla$ is the gradient operator. The gradient operator may be utilized to determine a minimum that optimizes a minimization problem.

In some configurations, the receiver 106 (e.g., channel equalizer 110) performs channel equalization based on the frequency-domain coefficient. For example, the channel equalizer 110 utilizes the adapted frequency-domain coefficients to perform channel equalization for a subsequent iteration (e.g., to determine a subsequent sample). In some configurations, the receiver 106 may utilize the time-domain coefficients to produce feedback for determining a subsequent estimated value. For instance, the adapted (e.g., updated) time-domain values may be utilized to produce feedback in accordance with Equation (3) (e.g., $g_{fb,1}\hat{x}_{n-1}$, $g_{fb,2}\hat{x}_{n-2}$, ..., $g_{fb,K}\hat{x}_{n-K}$).

In some configurations, the wireless communication device 102 (e.g., receiver 106) performs one or more of the techniques described herein in response to a channel condition and/or communication scheme. For instance, if a channel condition (e.g., threshold) is satisfied and/or if a particular communication scheme is being utilized, the wireless communication device 102 (e.g., receiver 106) may activate DFE (e.g., set a DFE activation flag) and/or perform one or more of the techniques described herein (e.g., slicing). For example, the receiver 106 may perform one or more of the techniques described herein in response to a determination of a channel condition. For instance, the receiver 106 may be configured to perform slicing in response to the determination of the channel condition. Examples of channel conditions include an amount and/or range of Doppler spread, delay spread, and/or wireless communication device 102 movement. For instance, the wireless communication device 102 (e.g., receiver 106) may include a Doppler spread detector to detect Doppler spread. In a case that the Doppler spread satisfies (e.g., is greater than or equal to) a Doppler spread threshold, the receiver 106 may perform one or more of the techniques described herein. In some examples, the wireless communication device (e.g., receiver 106) includes a delay spread detector to detect delay spread. In a case that the delay spread satisfies (e.g., is greater than or equal to) a delay spread threshold, the receiver 106 may perform one or more of the techniques described herein. In some examples, the wireless communication device 102 includes a motion detector (e.g., accelerometer, global positioning system (GPS) receiver, camera, etc.) to detect wireless communication device 102 motion (e.g., speed, velocity, acceleration, etc.). In a case that the motion (e.g., speed, velocity, acceleration, etc.) satisfies (e.g., is greater than or equal to) a motion threshold, the receiver 106 may perform one or more of the techniques described herein.

In some configurations, the receiver 106 performs one or more of the techniques described herein in response to a communication scheme. For example, the receiver 106 may be configured to perform slicing in response to a determination of a communication scheme. Examples of communication schemes or aspects of communication schemes include modulation and coding scheme (MCS) and constellations. For instance, each MCS has a corresponding rate (which may influence DFE improvement). A constellation (e.g., binary phase shift keying (BPSK), quadrature phase shift keying (QPSK), quadrature amplitude modulation (QAM), etc.) may change DFE slicer accuracy. In some examples, the wireless communication device 102 (e.g., receiver 106) performs one or more of the techniques described herein in response to a communication scheme and/or communication scheme aspect(s). For instance, the wireless communication device 102 (e.g., receiver 106) may include a look-up table and/or may utilize a function that maps a communication scheme to the activation or deactivation of one or more of the techniques described herein.

As described above, the wireless communication device 102 may perform one or more of the techniques described herein in response to a channel condition (e.g., amount and/or range of Doppler spread, delay spread, and/or movement, etc.) and/or communication scheme (e.g., MCS). For instance, the wireless communication device 102 may include one or more sensors (e.g., motion sensor(s), accelerometer(s), global positioning system (GPS) receiver(s), RF receiver(s), transmitter(s), transceiver(s), camera(s), etc.) that may be utilized to detect a channel condition and/or communication scheme.

Some examples of channel conditions that may be detected and/or that may trigger performance of one or more of the techniques described herein include a speed, relative speed, and/or Doppler shift. For instance, the wireless communication device 102 may determine (using accelerometer(s), GPS, speedometer(s), and/or received signal(s)) speed of the wireless communication device 102, relative speed between the wireless communication device 102 and another device, and/or Doppler shift. For instance, speed and/or Doppler shift may be estimated and/or obtained from vehicle sensors. In an example, 500 kilometers per hour (kph) is a relative speed between the wireless communication device 102 and another device (e.g., between two cars traveling at 250 kph in opposite directions). With a center frequency of 5.8 gigahertz (GHz), 500 kph in relative speed translates to a Doppler shift of 2700 Hz. With this high Doppler shift, constellations above QPSK may have 100% BLER for some communication schemes and/or rates (e.g., MCS 16, 17, etc.).

In some examples, the wireless communication device 102 determines whether the channel condition satisfies an activation condition (e.g., threshold speed of 100 kph, 200 kph, 250 kph, 400 kph, and/or Doppler shift of 500 Hz, 1000 Hz, 2000 Hz, 2250 Hz, 2500 Hz, and/or a Doppler spread amount, etc.) and/or whether a communication scheme (e.g., MCS 16, 17, etc.) is being utilized. For instance, if the wireless communication device 102 detects a speed greater than a threshold (e.g., 350 kph), a Doppler spread greater than a threshold (e.g., 2000 Hz), and/or that an MCS (e.g., MCS 16) is being used, then the wireless communication device may activate one or more of the techniques described herein (e.g., DFE and/or slicing). In some examples, if a deactivation condition is met (e.g., speed less than a threshold, speed of 0 kph, etc.) the wireless communication device 102 may deactivate and/or not utilize one or more of the techniques described herein (e.g., DFE and/or hard slicing). For instance, DFE and/or hard slicing may not be utilized for lower rates (e.g., with BLER of approximately $10^{-1}$).

Figure 2:
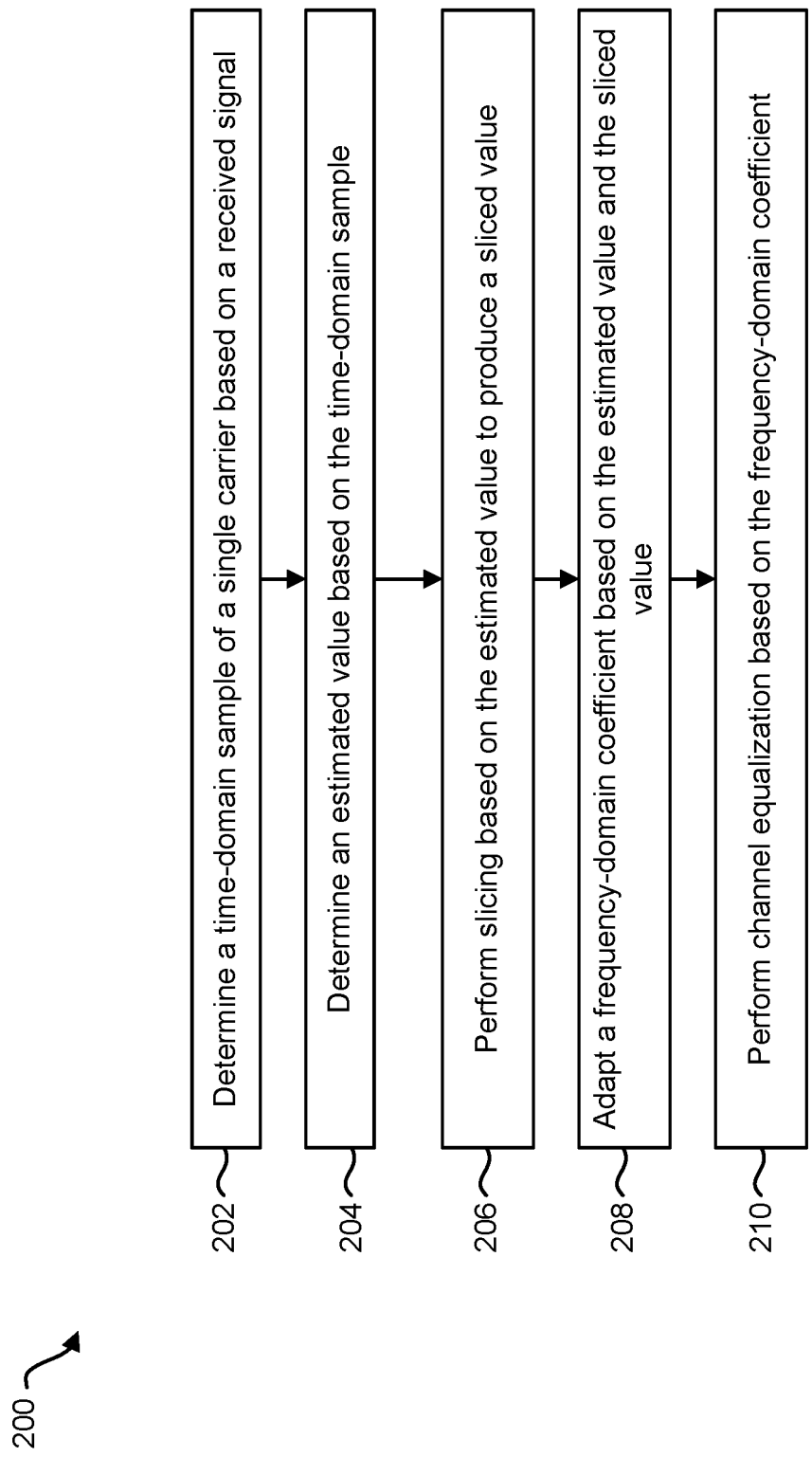
FIG. 2 is a flow diagram illustrating an example of a method for channel equalization.

FIG. 2 is a flow diagram illustrating an example of a method 200 for channel equalization. In some examples, the method 200 is performed by a wireless communication device (e.g., the wireless communication device 102 described in relation to FIG. 1).

A wireless communication device may determine 202 a time-domain sample of a single carrier based on a received signal. In some configurations, determining 202 one or more time-domain samples is performed as described above in relation to FIG. 1. For example, the wireless communication device receives a signal and performs a transform (e.g., DFT), channel equalization, and an inverse transform (e.g., IDFT) to produce the time-domain sample.

The wireless communication device may determine 204 an estimated value based on the time-domain sample. In some configurations, determining 204 one or more estimated values is performed as described above in relation to FIG. 1. For example, the wireless communication device may subtract a feedback value from the time-domain sample to produce the estimated value.

The wireless communication device performs 206 slicing based on the estimated value to produce a sliced value (e.g., hard sliced value). In some configurations, performing 206 slicing is performed as described above in relation to FIG. 1. For example, the wireless communication device may utilize an established constellation and determine a constellation point that is nearest to the estimated value to produce the sliced value.

The wireless communication device adapts 208 a frequency-domain coefficient based on the estimated value and the sliced value. In some configurations, adapting 208 one or more frequency-domain coefficients based on the estimated value and the sliced value is performed as described above in relation to FIG. 1. For example, the wireless communication device may determine a difference based on the estimated value and the sliced value (e.g., conjugates of the estimated value and the sliced value), which may be utilized to adapt 208 the frequency-domain coefficient. In some examples, the wireless communication device may also adapt a time-domain coefficient based on the estimated value and the sliced value (e.g., the difference).

The wireless communication device performs 210 channel equalization based on the frequency-domain coefficient. In some configurations, performing 210 channel equalization based on one or more frequency-domain coefficients is performed as described above in relation to FIG. 1. For instance, the wireless communication device may multiply one or more frequency-domain samples by respective frequency-domain coefficients to perform channel equalization.

Figure 3:
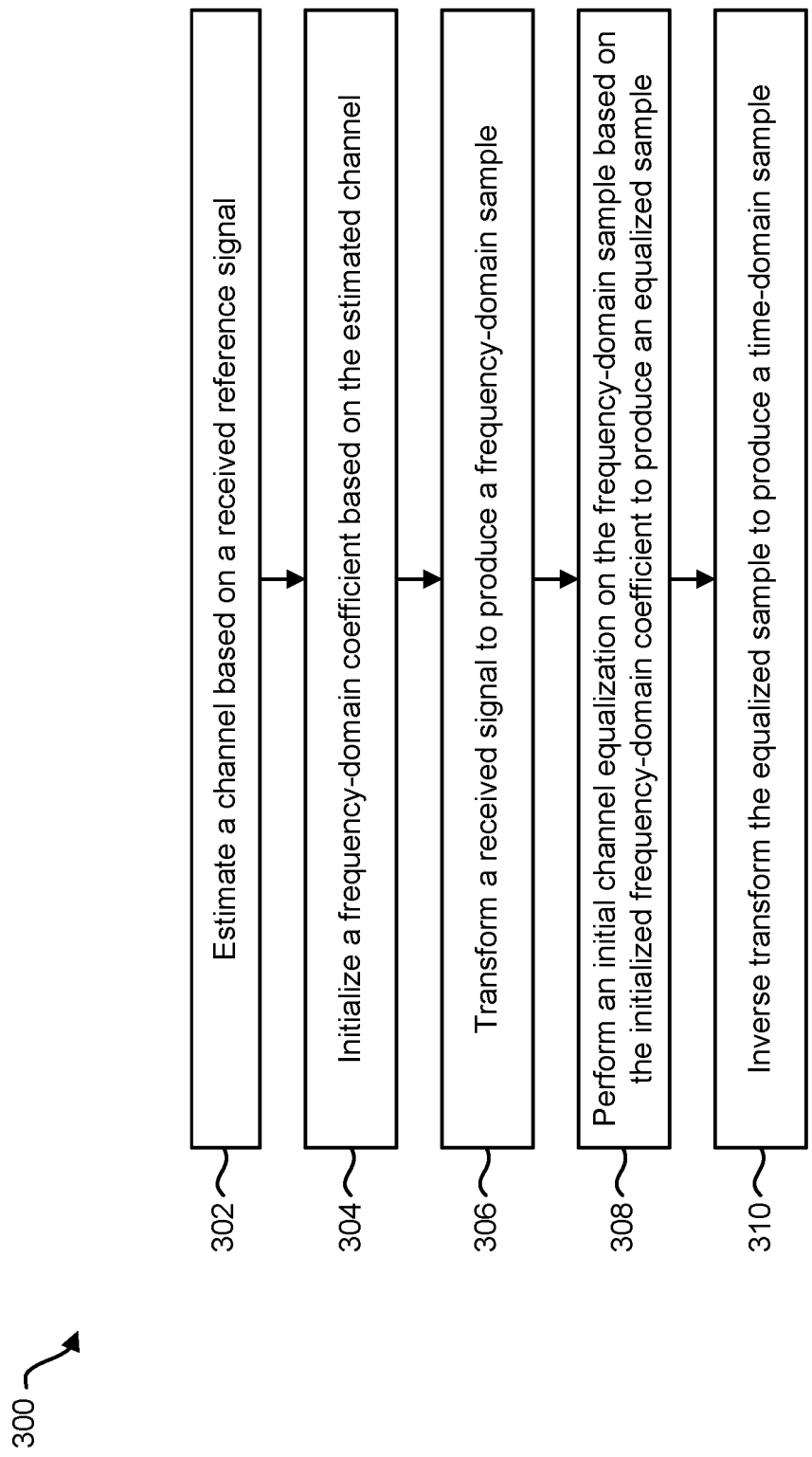
FIG. 3 is a flow diagram illustrating an example of a method for initializing decision feedback equalization from a reference signal.

FIG. 3 is a flow diagram illustrating an example of a method 300 for initializing decision feedback equalization from a reference signal. In some examples, the method 300 is performed by a wireless communication device (e.g., the wireless communication device 102 described in relation to FIG. 1). In some configurations, one or more of the functions, procedures, operations, etc., described in relation to FIG. 3 may be combined with one or more of the functions, procedures, operations, methods, etc. described herein.

A wireless communication device may estimate 302 a channel based on a received reference signal. In some configurations, estimating 302 the channel is performed as described above in relation to FIG. 1. For example, the wireless communication device may receive a reference signal and utilize the reference signal to determine channel characteristics.

The wireless communication device may initialize 304 a frequency-domain coefficient based on the estimated channel. In some configurations, initializing 304 one or more frequency-domain coefficients is performed as described above in relation to FIG. 1. For example, the wireless communication device may utilize quantities from equalization coefficients derived from the estimated channel as the initial frequency-domain coefficients. For instance, the initial frequency-domain coefficients may be equalization parameters determined by the wireless communication device (e.g., modem). In some examples, the wireless communication device may perform linear minimum mean square error (LMMSE) channel estimation with a channel covariance matrix (Rhh) and a channel noise covariance matrix (Rnn) to produce the equalization coefficients.

The wireless communication device may transform 306 a received signal to produce a frequency-domain sample. In some configurations, transforming 306 the received signal is performed as described above in relation to FIG. 1. For example, the wireless communication device may perform a Fourier transform, FFT, DFT, etc., on the received signal (e.g., samples of the received signal in the time domain) to produce one or more frequency-domain samples.

The wireless communication device may perform 308 an initial channel equalization on the frequency-domain sample based on the initialized frequency-domain coefficient to produce an equalized sample. In some configurations, performing 308 an initial channel equalization on one or more frequency domain samples based on one or more initialized frequency-domain coefficients is performed as described above in relation to FIG. 1. For example, the wireless communication device may multiply frequency-domain samples with the initialized frequency domain coefficients to produce equalized samples.

The wireless communication device may inverse transform 310 the equalized sample to produce a time-domain sample. In some configurations, inverse transforming 310 equalized samples is performed as described above in relation to FIG. 1. For instance, the wireless communication device may apply an inverse Fourier transform (e.g., IFFT, IDFT) on the equalized samples to produce time-domain samples.

Figure 4:
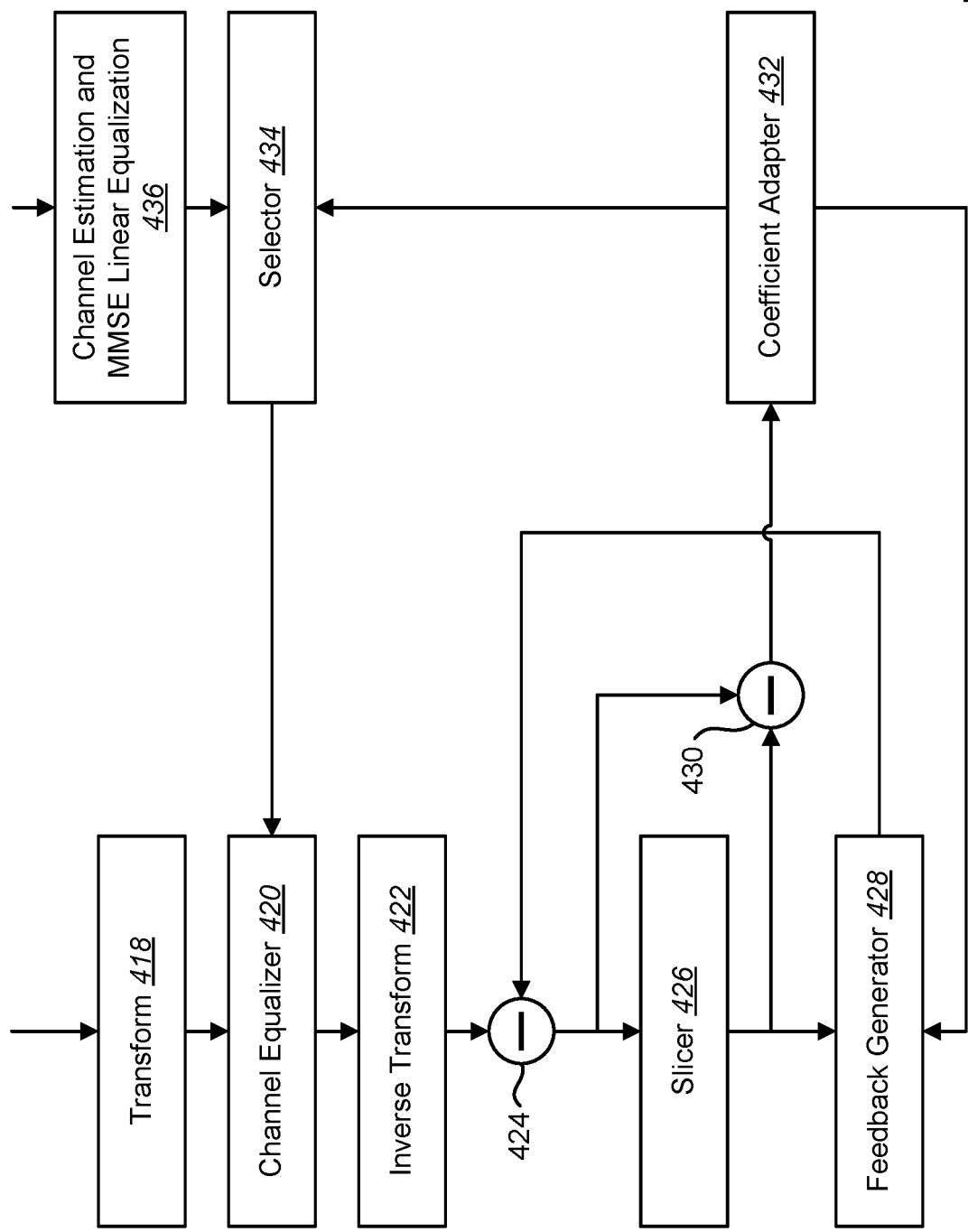
FIG. 4 is a block diagram illustrating an example of functions and/or blocks for performing channel equalization in accordance with some of the configurations described herein.

FIG. 4 is a block diagram illustrating an example of functions and/or blocks for performing channel equalization in accordance with some of the configurations described herein. For example, FIG. 4 illustrates a transform 418, channel equalizer 420, inverse transform 422, first subtractor 424, slicer 426, feedback generator 428, second subtractor 430, channel estimation and minimum mean square estimation (MMSE) linear equalization 436, selector 434, and coefficient adapter 432. One or more of the functions and/or blocks described in relation to FIG. 4 may be implemented in hardware (e.g., circuitry) or in a combination of hardware and instructions (e.g., software and/or firmware). In some configurations, one or more of the functions and/or blocks described in relation to FIG. 4 are included in the wireless communication device 102 (e.g., receiver 106) described in relation to FIG. 1. In some configurations, the functions described in relation to FIG. 4 are performed in accordance with one or more of the methods and/or operations described herein.

A wireless communication device may receive a reference signal (e.g., DMRS). The reference signal may be provided to the channel estimation and MMSE linear equalization 436. The channel estimation and MMSE linear equalization 436 estimates a channel and/or produces equalization parameters (e.g., equalization coefficients) based on the reference signal. In some configurations, estimating the channel and/or producing equalization parameters are performed as described above in relation to FIG. 1 and/or FIG. 3. The channel estimation and MMSE linear equalization 436 may produce a channel estimate and/or equalization parameters, which may be provided to the selector 434.

The selector 434 determines whether to select frequency-domain coefficients from the channel estimation and MMSE linear equalization 436 or from the coefficient adapter 432. For example, the selector 434 determines frequency-domain coefficients (e.g., initializes frequency-domain coefficients) from the channel estimation and MMSE linear equalization 436 in a case that a channel condition is satisfied, in a case that a particular communication scheme is beginning to be utilized, and/or if a DFE activation flag is detected. For instance, the selector 434 may determine frequency-domain coefficients from the channel estimation and MMSE linear equalization 436 for a first iteration (of DFE, for instance). After the first (e.g., initial) iteration, the selector 434 determines frequency-domain coefficients from the coefficient adapter 432. In some examples, the selector 434 may reset when DFE and/or slicing is deactivated. In some examples, selecting and/or initializing frequency-domain coefficients are performed as described in relation to FIG. 1 and/or FIG. 3. The selector 434 may provide the selected and/or determined frequency-domain coefficients to the channel equalizer 420.

A received signal may be provided to the transform 418. The transform 418 transforms the received signal to produce a frequency-domain samples. In some configurations, transforming the received signal is performed as described in relation to FIG. 1, FIG. 2, and/or FIG. 3. For example, the wireless communication device may perform a Fourier transform, FFT, DFT, etc., on the received signal to produce frequency-domain samples.

The frequency-domain samples may be provided to the channel equalizer 420. For an initial iteration, the channel equalizer 420 may perform an initial channel equalization on the frequency-domain samples based on initialized frequency-domain coefficients from the selector 434 to produce equalized samples. In some configurations, performing an initial channel equalization is performed as described in relation to FIG. 1 and/or FIG. 3. For iterations after the initial iteration, the channel equalizer 420 may perform channel equalization based on adapted frequency-domain coefficients to produce equalized samples. For instance, the adapted frequency-domain coefficients may be produced by the coefficient adapter 432 and provided to the channel equalizer 420 by the selector 434. In some configurations, performing a channel equalization for a subsequent iteration (after the initial iteration, for example) is performed as described in relation to FIG. 1 and/or FIG. 2. The channel equalizer may provide the equalized samples to the inverse transform 422.

The inverse transform 422 performs an inverse transformation on the equalized samples. In some configurations, inverse transforming equalized samples is performed as described in relation to FIG. 1, FIG. 2, and/or FIG. 3. For instance, the wireless communication device may apply an inverse Fourier transform (e.g., IFFT, IDFT) on the equalized samples to produce time-domain samples. The time-domain samples may be provided to the first subtractor 424. In some examples, the time-domain samples are provided to a serial-to-parallel converter (of a wireless communication device 102 and/or receiver 106, for instance), which converts the time-domain samples into parallel streams and provide the time-domain samples to the first subtractor.

The first subtractor 424 subtracts one or more feedback values from one or more time-domain samples to produce one or more estimated values. In some configurations, determining 204 one or more estimated values is performed as described in relation to FIG. 1 and/or FIG. 2. The estimated value(s) may be provided to the slicer 426 and/or to the second subtractor 430.

The slicer 426 performs slicing (e.g., hard slicing) based on the estimated value(s) to produce one or more sliced values. In some configurations, performing slicing is performed as described above in relation to FIG. 1 and/or FIG. 2. The sliced value(s) may be provided to the second subtractor 430 and/or to the feedback generator 428.

The second subtractor 430 performs a subtraction based on the estimated value(s) and the sliced value(s) to produce a difference. For instance, the second subtractor 430 may subtract a conjugate of the estimated value(s) from a conjugate of the sliced value(s) to produce the difference. The difference may be provided to the coefficient adapter. The coefficient adapter 432 adapts (e.g., updates) frequency-domain coefficients and time-domain coefficients based on the difference of the conjugates of the estimated value and the sliced value. For instance, the coefficient adapter 432 may utilize the sliced value and the estimated value or a quantity based on the estimated value in an adaptation calculation (e.g., Equation (9)) to produce the adapted frequency-domain coefficients and/or adapted time-domain coefficients. In some configurations, adapting the frequency-domain coefficients and the time-domain coefficients is performed as described in relation to FIG. 1 and/or FIG. 2. The coefficient adapter 432 may provide the adapted frequency-domain coefficients to the selector 434 and/or may provide the adapted time-domain coefficients to the feedback generator 428.

The feedback generator 428 generates one or more feedback values based on the sliced value and time-domain coefficients. For an initial iteration, the time-domain coefficient(s) and/or feedback value(s) may be set to zero. For one or more subsequent iterations, the feedback generator 428 may generate the feedback value(s) based on the sliced value(s) and/or adapted time domain coefficients. The feedback value(s) may be provided to the first subtractor 424. In some examples, generating the feedback value(s) is performed as described in relation to FIG. 1.

Figure 5:
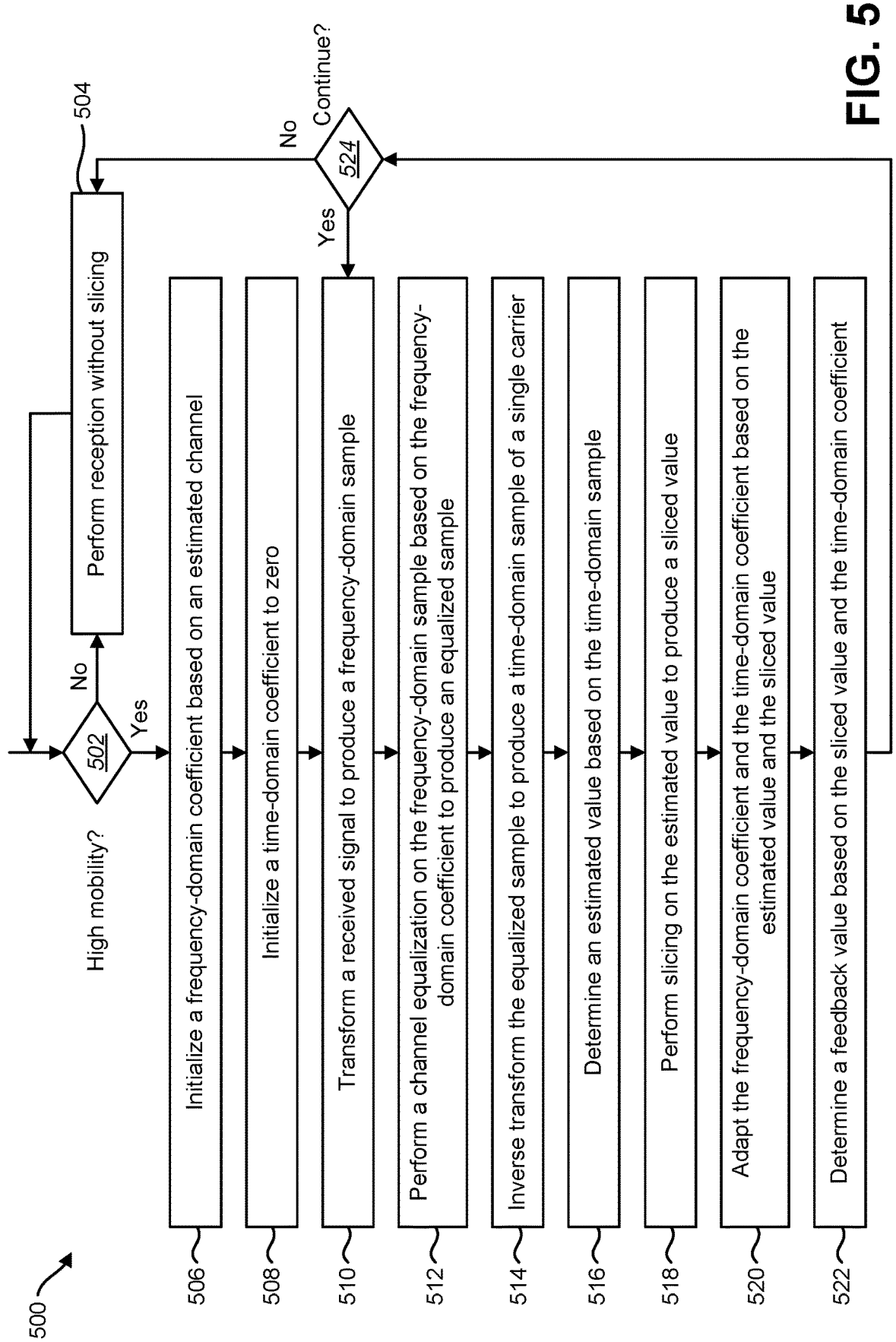
FIG. 5 is a flow diagram illustrating another example of a method for channel equalization.

FIG. 5 is a flow diagram illustrating another example of a method 500 for channel equalization. In some examples, the method 500 is performed by a wireless communication device (e.g., the wireless communication device 102 described in relation to FIG. 1).

A wireless communication device determines 502 whether the wireless communication device is in a high mobility scenario. In some configurations, determining 502 whether the wireless communication device is in a high mobility scenario is performed as described above in relation to FIG. 1. For example, the wireless communication device may determine whether the wireless communication device is in a high mobility scenario based on one or more channel conditions, communication scheme, and/or mobility detection. In some examples, the determination 502 may be a determination whether to activate slicing and/or DFE.

In a case that the wireless communication device is not in a high mobility scenario (and/or it is determined to not use slicing and/or DFE), the wireless communication device performs 504 reception without slicing (and/or DFE). For example, the wireless communication device may perform reception of an SC-FDMA signal without slicing and/or DFE. In some configurations, the wireless communication device may continue to monitor whether the wireless communication device is entering a high mobility scenario (and/or whether to activate slicing and/or DFE).

In a case that the wireless communication device is in a high-mobility scenario (and/or if it is determined to activate slicing and/or DFE), the wireless communication device initializes 506 a frequency-domain coefficient based on the estimated channel. In some configurations, initializing 506 one or more frequency-domain coefficients is performed as described in relation to FIG. 1, FIG. 3, and/or FIG. 4.

The wireless communication device may initialize 508 a time-domain coefficient to zero. In some configurations, initializing 506 one or more frequency-domain coefficients is performed as described in relation to FIG. 1 and/or FIG. 4.

The wireless communication device may transform 510 a received signal to produce a frequency-domain sample. In some configurations, transforming 510 the received signal is performed as described above in relation to FIG. 1, FIG. 3, and/or FIG. 4.

The wireless communication device may perform 512 channel equalization on the frequency-domain sample based on the frequency-domain coefficient to produce an equalized sample. In some configurations, performing 512 channel equalization on one or more frequency domain samples based on one or more frequency-domain coefficients is performed as described in relation to FIG. 1, FIG. 3, and/or FIG. 4.

The wireless communication device may inverse transform 514 the equalized sample to produce a time-domain sample of a single carrier (e.g., SC-FDMA carrier). In some configurations, inverse transforming 514 equalized samples is performed as described above in relation to FIG. 1, FIG. 3, and/or FIG. 4.

The wireless communication device may determine 516 an estimated value based on the time-domain sample. In some configurations, determining 516 one or more estimated values is performed as described in relation to FIG. 1, FIG. 2, and/or FIG. 4.

The wireless communication device may perform 518 slicing on the estimated value to produce a sliced value (e.g., hard sliced value). In some configurations, performing 518 slicing is performed as described above in relation to FIG. 1, FIG. 2, and/or FIG. 4.

The wireless communication device may adapt 520 a frequency-domain coefficient and a time-domain coefficient based on the estimated value and the sliced value. In some configurations, adapting 520 one or more frequency-domain coefficients and/or time-domain coefficients based on the estimated value and the sliced value is performed as described in relation to FIG. 1, FIG. 2, and/or FIG. 4.

The wireless communication device may determine 522 a feedback value based on the sliced value and the time-domain coefficient. In some configurations, determining 522 the feedback value is performed as described in relation to FIG. 1 and/or FIG. 4.

The wireless communication device may determine 524 whether to continue reception using slicing (e.g., DFE). For example, the wireless communication device may determine 524 whether the wireless communication device is still in a high mobility scenario (e.g., whether the channel condition(s) are satisfied, whether a particular communication scheme is being used, and/or whether a mobility condition is satisfied). In a case that it is determined to continue, the wireless communication device may transform 510 a received signal (e.g., subsequently received signal), may perform channel equalization based on adapted frequency-domain coefficients, and so on.

Figure 6:
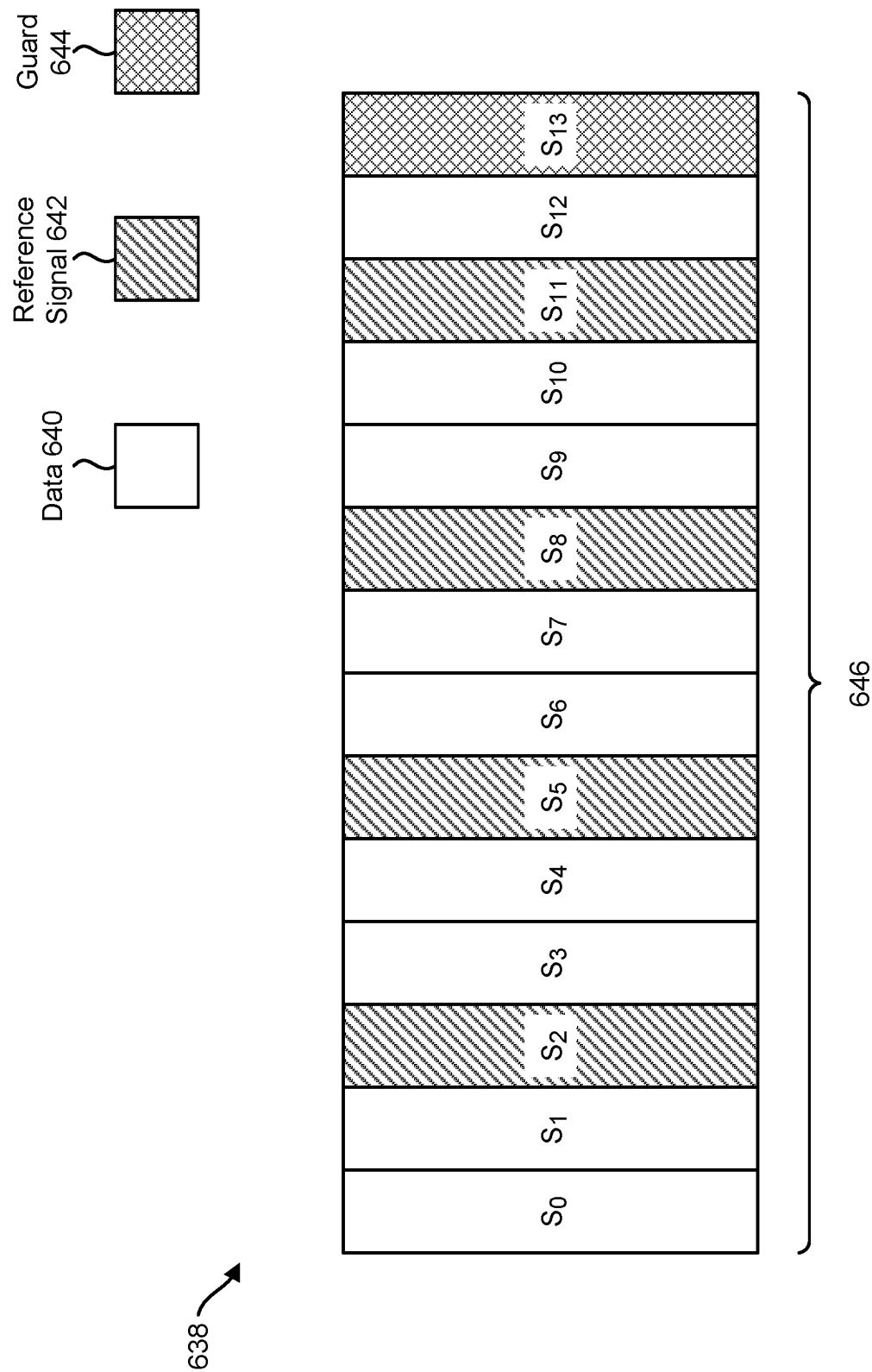
FIG. 6 is a diagram illustrating an example of a subframe of symbols for a single-carrier frequency-division multiple access (SC-FDMA) cellular vehicle-to-everything (C-V2X) waveform.

FIG. 6 is a diagram illustrating an example of a subframe 646 of symbols 638 for an SC-FDMA C-V2X waveform. For instance, the symbols 638 may be produced in accordance with some aspects of Release 15 specifications. In this example, some of the symbols 638 carry data 640 (e.g., PSSCH and/or PSCCH data), some of the symbols 638 carry a reference signal 642 (e.g., DMRS), and one of the symbols 638 is a guard 644 symbol. A wireless communication device may utilize the reference signal 642 symbols to estimate the channel, to interpolate the channel for the data 640 symbols between the reference signal 642 symbols, and to extrapolate the channel for the last data 640 symbol (symbol $S_{12}$). In some high mobility scenarios, this approach may be insufficient to enable accurate reception of the data 640. Adding reference signal symbols may still be insufficient in some scenarios as described above. Some of the techniques described herein may help to alleviate this issue by activating DFE in high mobility scenarios.

Figure 7:
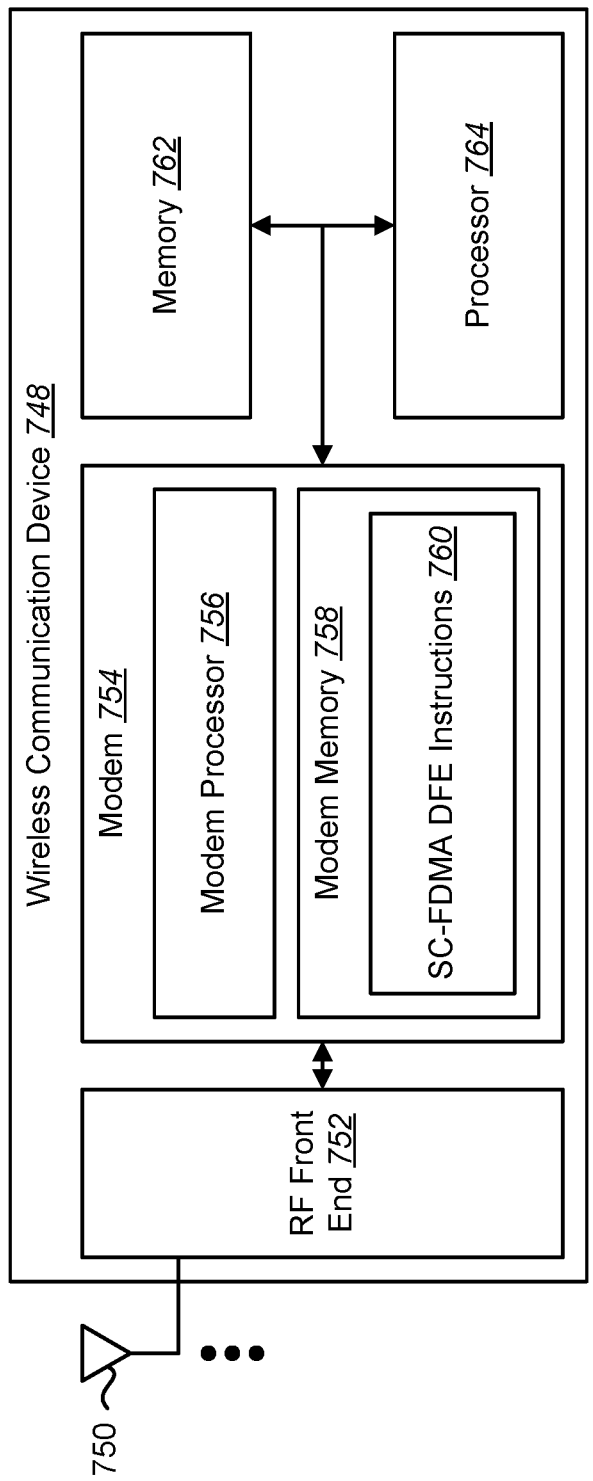
FIG. 7 is a block diagram illustrating a more specific example of a wireless communication device in which systems and methods for channel equalization for wireless communication devices may be implemented.

FIG. 7 is a block diagram illustrating a more specific example of a wireless communication device 748 in which systems and methods for channel equalization for wireless communication devices may be implemented. The wireless communication device 748 may be an example of the wireless communication device 102 described in relation to FIG. 1.

In some configurations, the wireless communication device 748 includes one or more antennas 750, an RF front-end (RFE) 752, a modem 754, modem processor 756, modem memory 758, SC-FDMA DFE instructions 760, memory 762, and/or processor 764. In some configurations, the wireless communication device 748 includes one or more other components and/or elements and/or may omit one or more of the components and/or elements shown.

The RFE 752 receives signals provided by the one or more antennas 750. In some configurations, RFE 752 may include one or more switches, one or more filters, one or more power amplifiers, one or more downconverters, and/or one or more upconverters, etc., to enable wireless communication. The RFE 752 may provide received signals to the modem 754. In some examples, the RFE 752 and/or modem 754 is included in a transceiver.

The modem 754 includes a modem processor 756. The modem processor 756 reads SC-FDMA DFE instructions 760 from the modem memory 758. The SC-FDMA DFE instructions 760 may include instructions for performing one or more of the functions, operations, procedures, methods, etc., described herein. For example, the modem processor 756 executes the SC-FDMA DFE instructions 760 to perform one or more of the functions described in relation to FIG. 4 and/or methods 200, 300, 500 described herein. For instance, the modem processor 756 may execute the SC-FDMA DFE instructions 760 when the wireless communication device 748 enters a high-mobility scenario. The modem 754 may provide data (e.g., demodulated and/or decoded data) to the memory 762 and/or processor 764. The memory 762 may be separate from the modem memory 758 in some configurations and/or the processor 764 may be separate from the modem processor 756 in some configurations. For example, the processor 764 may be an application processor that may utilize the data provided by the modem.

Figure 8:
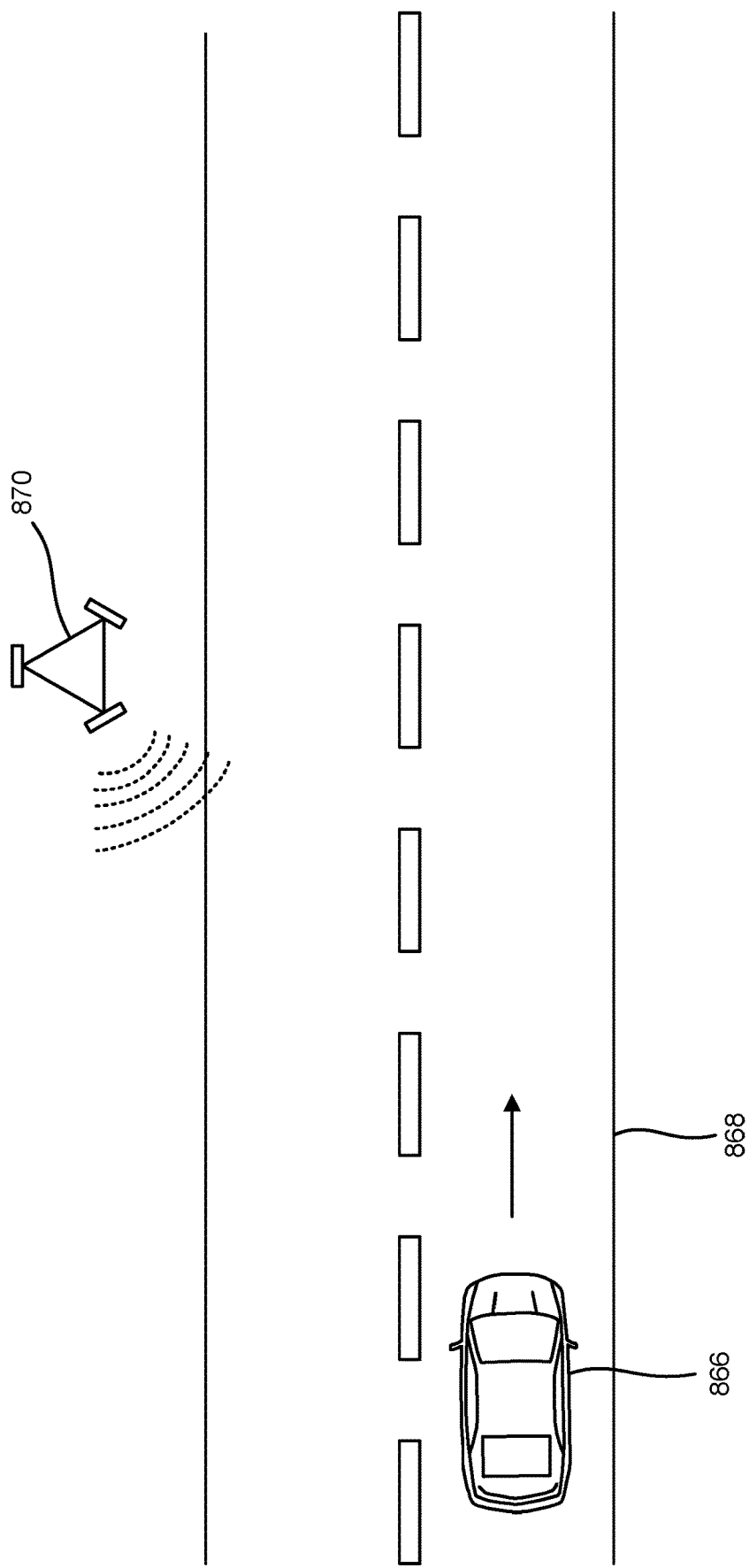
FIG. 8 is a diagram illustrating an example of a vehicle in motion on a road.

FIG. 8 is a diagram illustrating an example of a vehicle 866 in motion on a road 868. The vehicle 866 may be an example of one or more of the wireless communication devices described herein. In this example, the vehicle 866 is proceeding in motion on a road 868 while passing a base station 870. When the vehicle 866 is traveling with high mobility, significant Doppler shift may occur in a signal sent from the base station 870. For instance, high mobility may cause the communication channel to change rapidly. Some of the techniques described herein may be utilized to improve throughput and performance in signal reception for wireless communication devices (e.g., the vehicle 866) in high mobility scenarios.

Figure 9:
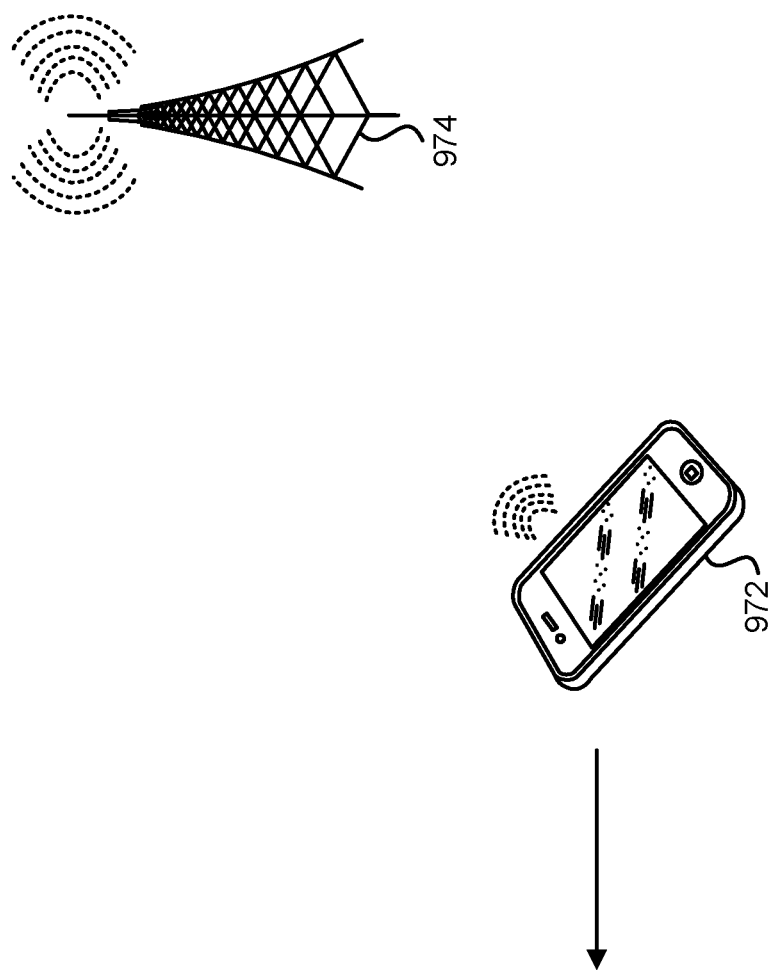
FIG. 9 is a diagram illustrating an example of a smartphone in motion relative to a base station.

FIG. 9 is a diagram illustrating an example of a smartphone 972 in motion relative to a base station 974. The smartphone 972 may be an example of one or more of the wireless communication devices described herein. In this example, the smartphone 972 is proceeding in motion away from the base station 974. When the smartphone 972 is traveling with high mobility (e.g., in a vehicle or aircraft), significant Doppler shift may occur in a signal sent from the base station 974 and/or in a signal sent from the smartphone 972. For instance, high mobility may cause the communication channel to change rapidly. Some of the techniques described herein may be utilized to improve throughput and performance in signal reception for wireless communication devices (e.g., the smartphone 972) in high mobility scenarios. Some examples of the techniques described herein may be utilized in other high-mobility scenarios (e.g., rapidly moving drones, rapidly moving vehicles communicating with each other, aircraft, etc.).

Figure 10:
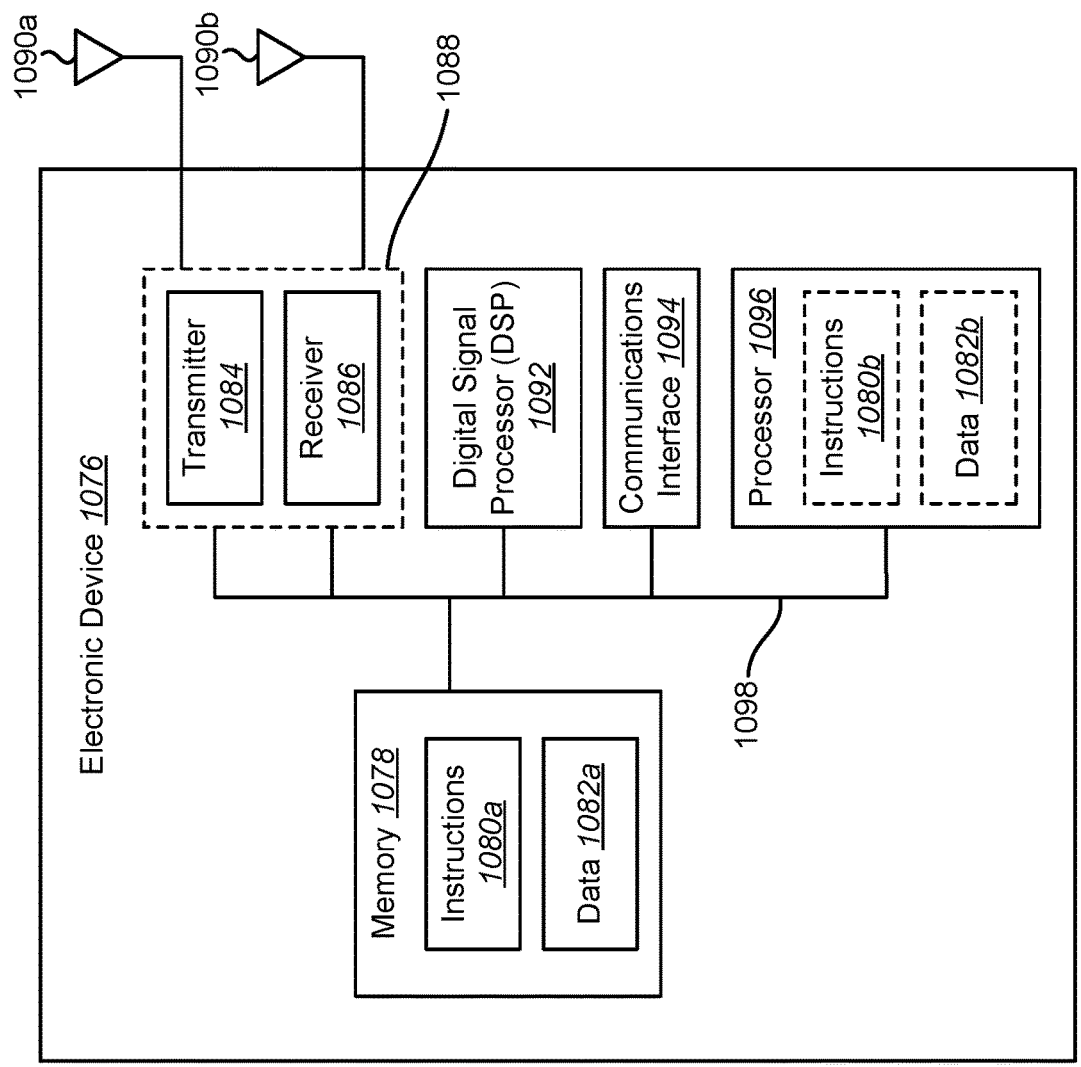
FIG. 10 illustrates certain components that may be included within an electronic device configured to implement various configurations of the systems and methods disclosed herein for channel equalization for wireless communication devices.

FIG. 10 illustrates certain components that may be included within an electronic device 1076 configured to implement various configurations of the systems and methods disclosed herein for channel equalization for wireless communication devices. The electronic device 1076 may be an access terminal, a mobile station, a user equipment (UE), a smartphone, a digital camera, a video camera, a tablet device, a laptop computer, a desktop computer, an Internet of Things (IoT) device, a base station, an access point, a vehicle, a drone, etc. The electronic device 1076 may be implemented in accordance with one or more of the wireless communication devices (e.g., wireless communication device 102) described herein.

The electronic device 1076 includes a processor 1096. The processor 1096 may be a general purpose single- or multi-chip microprocessor (e.g., an ARM), a special purpose microprocessor (e.g., a digital signal processor (DSP)), a microcontroller, a programmable gate array, etc. The processor 1096 may be referred to as a central processing unit (CPU) and/or a modem processor. Although a single processor 1096 is shown in the electronic device 1076, in an alternative configuration, a combination of processors (e.g., an ARM and DSP) could be implemented.

The electronic device 1076 also includes memory 1078. The memory 1078 may be any electronic component capable of storing electronic information. The memory 1078 may be embodied as random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), synchronous dynamic random-access memory (SDRAM), registers, and so forth, including combinations thereof.

Data 1082*a* and instructions 1080*a* may be stored in the memory 1078. The instructions 1080*a* may be executable by the processor 1096 to implement one or more of the methods described herein. Executing the instructions 1080*a* may involve the use of the data 1082*a* that is stored in the memory 1078. When the processor 1096 executes the instructions 1080, various portions of the instructions 1080*b* may be loaded onto the processor 1096 and/or various pieces of data 1082*b* may be loaded onto the processor 1096. In some configurations, the instructions 1080 may be executable to implement and/or perform one or more of the methods 200, 300, 500, and/or one or more of the functions, procedures, and/or operations described herein.

The electronic device 1076 may also include a transmitter 1084 and a receiver 1086 to allow transmission and reception of signals to and from the electronic device 1076. The transmitter 1084 and receiver 1086 may be collectively referred to as a transceiver 1088. One or more antennas 1090*a-b* may be electrically coupled to the transceiver 1088. The electronic device 1076 may also include (not shown) multiple transmitters, multiple receivers, multiple transceivers and/or additional antennas.

The electronic device 1076 may include a digital signal processor (DSP) 1092. The electronic device 1076 may also include a communications interface 1094. The communications interface 1094 may allow and/or enable one or more kinds of input and/or output. For example, the communications interface 1094 may include one or more ports and/or communication devices for linking other devices to the electronic device 1076. In some configurations, the communications interface 1094 may include the transmitter 1084, the receiver 1086, or both (e.g., the transceiver 1088). Additionally or alternatively, the communications interface 1094 may include one or more other interfaces (e.g., touchscreen, keypad, keyboard, microphone, camera, etc.). For example, the communication interface 1094 may enable a user to interact with the electronic device 1076.

The various components of the electronic device 1076 may be coupled together by one or more buses, which may include a power bus, a control signal bus, a status signal bus, a data bus, etc. For the sake of clarity, the various buses are illustrated in FIG. 10 as a bus system 1098.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" may describe "based only on" and/or "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, compact disc read-only memory (CD-ROM) or other optical disk storage, magnetic disk storage or other magnetic storage devices, or any other medium that can be used to carry or store program code in the form of instructions and/or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims. For example, one or more of the operations, functions, elements, aspects, etc., described herein may be omitted or combined.

Some examples of the systems and methods described herein are given as follows. In a first example, a method includes determining a time-domain sample of a single carrier based on a received signal. The method also includes determining an estimated value based on the time-domain sample. The method further includes performing slicing based on the estimated value to produce a sliced value. The method additionally includes adapting a frequency-domain coefficient based on the estimated value and the sliced value. The method also includes performing channel equalization based on the frequency-domain coefficient.

In a second example in combination with the first example, to determine the time-domain sample, the method also includes transforming the received signal to produce a frequency-domain sample. The method further includes performing an initial channel equalization on the frequency-domain sample to produce an equalized sample. The method additionally includes inverse transforming the equalized sample to produce the time-domain sample of the single carrier.

In a third example in combination with the second example, the method includes estimating a channel based on a received reference signal. The method also includes initializing the frequency-domain coefficient based on the estimated channel. The method further includes performing the initial channel equalization based on the initialized frequency-domain coefficient.

In a fourth example in combination with any of the preceding examples, the method includes performing the slicing in response to a determination of a channel condition. In a fifth example in combination with the fourth example, the channel condition is based on at least one of Doppler spread, delay spread, or wireless communication device movement.

In a sixth example in combination with any of the preceding examples, the method includes initializing a time-domain coefficient to zero. In a seventh example in combination with any of the preceding examples, the method includes adapting a time-domain coefficient based on the estimated value and the sliced value.

In an eighth example in combination with any of the preceding examples, the method includes determining a feedback value based on a time-domain coefficient. The method also includes determining the estimated value based on the feedback value and the time-domain sample. In a ninth example in combination with the eighth example, the method includes determining the estimated value as a difference between the feedback value and the time-domain sample. In a tenth example in combination with any of the preceding examples, the time-domain sample is based on a single-carrier frequency-division multiple access (SC-FDMA) signal.

In an eleventh example in combination with any of the preceding examples, a wireless communication device includes a receiver that is configured to perform any of the methods of any of the preceding examples. In a twelfth example in combination with any of the first to the tenth examples, a non-transitory tangible computer-readable medium stores computer-executable code that includes code for causing a processor to perform any of the methods of any of the first to tenth examples. In a thirteenth example in combination with any of the first to tenth examples, an apparatus includes means for performing any of the methods of any of the first to tenth examples.

What is claimed is:

1. A wireless communication device, comprising:
a receiver, wherein the receiver is configured to:
determine a time-domain sample of a single carrier based on a received signal;
determine an estimated value based on the time-domain sample;
perform slicing based on the estimated value and in response to a determination of a channel condition to produce a sliced value;
adapt a frequency-domain coefficient based on the estimated value and the sliced value; and perform channel equalization based on the frequency-domain coefficient.

2. The wireless communication device of claim 1, wherein to determine the time-domain sample, the receiver is configured to:
transform the received signal to produce a frequency-domain sample;
perform an initial channel equalization on the frequency-domain sample to produce an equalized sample; and
inverse transform the equalized sample to produce the time-domain sample of the single carrier.

3. The wireless communication device of claim 2, wherein the receiver is configured to:
estimate a channel based on a received reference signal;
initialize the frequency-domain coefficient based on the estimated channel; and
perform the initial channel equalization based on the initialized frequency-domain coefficient.

4. The wireless communication device of claim 1, wherein the channel condition is based on at least one of Doppler spread, delay spread, or wireless communication device movement.

5. The wireless communication device of claim 1, wherein the receiver is configured to initialize a time-domain coefficient to zero.

6. The wireless communication device of claim 1, wherein the receiver is configured to adapt a time-domain coefficient based on the estimated value and the sliced value.

7. The wireless communication device of claim 1, wherein the receiver is configured to:
determine a feedback value based on a time-domain coefficient; and
determine the estimated value based on the feedback value and the time-domain sample.

8. The wireless communication device of claim 7, wherein the receiver is configured to determine the estimated value as a difference between the feedback value and the time-domain sample.

9. The wireless communication device of claim 1, wherein the time-domain sample is based on a single-carrier frequency-division multiple access (SC-FDMA) signal.

10. A method performed by a wireless communication device, comprising:
determining a time-domain sample of a single carrier based on a received signal;
determining an estimated value based on the time-domain sample;
performing slicing based on the estimated value and in response to a determination of a channel condition to produce a sliced value;
adapting a frequency-domain coefficient based on the estimated value and the sliced value; and
performing channel equalization based on the frequency-domain coefficient.

11. The method of claim 10, wherein determining the time-domain sample comprises:
transforming the received signal to produce a frequency-domain sample;
performing an initial channel equalization on the frequency-domain sample to produce an equalized sample; and
inverse transforming the equalized sample to produce the time-domain sample of the single carrier.

12. The method of claim 11, further comprising:
estimating a channel based on a received reference signal;
initializing the frequency-domain coefficient based on the estimated channel; and
performing the initial channel equalization based on the initialized frequency-domain coefficient.

13. The method of claim 10, wherein the channel condition is based on at least one of Doppler spread, delay spread, or wireless communication device movement.

14. The method of claim 10, further comprising initializing a time-domain coefficient to zero.

15. The method of claim 10, further comprising adapting a time-domain coefficient based on the estimated value and the sliced value.

16. The method of claim 10, further comprising:
determining a feedback value based on a time-domain coefficient; and
determining the estimated value based on the feedback value and the time-domain sample.

17. The method of claim 16, further comprising determining the estimated value as a difference between the feedback value and the time-domain sample.

18. The method of claim 10, wherein the time-domain sample is based on a single-carrier frequency-division multiple access (SC-FDMA) signal.

19. A non-transitory tangible computer-readable medium storing computer-executable code, comprising:
code for causing a processor to determine a time-domain sample of a single carrier based on a received signal;
code for causing the processor to determine an estimated value based on the time-domain sample;
code for causing the processor to perform slicing based on the estimated value and in response to a determination of a channel condition to produce a sliced value;
code for causing the processor to adapt a frequency-domain coefficient based on the estimated value and the sliced value; and
code for causing the processor to perform channel equalization based on the frequency-domain coefficient.

20. The computer-readable medium of claim 19, wherein the code for causing the processor to determine the time-domain sample comprises:
code for causing the processor to transform the received signal to produce a frequency-domain sample;
code for causing the processor to perform an initial channel equalization on the frequency-domain sample to produce an equalized sample; and
code for causing the processor to inverse transform the equalized sample to produce the time-domain sample of the single carrier.

21. The computer-readable medium of claim 19, further comprising code for causing the processor to initialize a time-domain coefficient to zero.

22. The computer-readable medium of claim 19, further comprising code for causing the processor to adapt a time-domain coefficient based on the estimated value and the sliced value.

23. An apparatus, comprising:
means for determining a time-domain sample of a single carrier based on a received signal;
means for determining an estimated value based on the time-domain sample;
means for performing slicing based on the estimated value and in response to a determination of a channel condition to produce a sliced value;
means for adapting a frequency-domain coefficient based on the estimated value and the sliced value; and
means for performing channel equalization based on the frequency-domain coefficient.

24. The apparatus of claim 23, wherein the means for determining the time-domain sample comprises:

means for transforming the received signal to produce a frequency-domain sample;
means for performing an initial channel equalization on the frequency-domain sample to produce an equalized sample; and
means for inverse transforming the equalized sample to produce the time-domain sample of the single carrier.

25. The apparatus of claim 23, further comprising means for initializing a time-domain coefficient to zero.

26. The apparatus of claim 23, further comprising means for adapting a time-domain coefficient based on the estimated value and the sliced value.

* * * * *